United States Patent [19]

Shafer

[11] Patent Number: 5,016,896
[45] Date of Patent: May 21, 1991

[54] DOUBLE BED TRAILER

[76] Inventor: Robert L. Shafer, 5826 Scribner Rd., N.W., Bemidji, Minn. 56601

[21] Appl. No.: 392,469

[22] Filed: Aug. 11, 1989

[51] Int. Cl.⁵ .................................................. B60P 1/24
[52] U.S. Cl. ................................ 280/400; 298/8 R; 414/483; 414/482
[58] Field of Search ............... 280/400, 404, 405.1, 280/492, 503, 425.1, 479.1, 490.1; 414/474, 476, 481, 482, 484, 485, 430, 469, 483; 298/8 R

[56] References Cited

U.S. PATENT DOCUMENTS

| | | | |
|---|---|---|---|
| 2,852,152 | 9/1958 | Rosselle | 414/482 |
| 2,995,399 | 8/1961 | Riseborough | 414/483 |
| 3,338,440 | 8/1967 | Donahue | 414/482 |
| 3,604,579 | 9/1971 | Jenkins | 214/505 |
| 3,620,397 | 11/1971 | Gagnon | 414/482 |
| 3,720,335 | 3/1973 | Ward | 214/505 |
| 3,720,336 | 3/1973 | Murray et al. | 214/505 |
| 3,730,542 | 5/1973 | Chadwick | 280/9 |
| 3,731,831 | 5/1973 | Huff | 214/506 |
| 3,786,950 | 1/1974 | Zemien | 214/506 |
| 3,945,521 | 3/1976 | Decker | 214/506 |
| 3,989,270 | 11/1976 | Henderson | 280/478 |
| 4,014,444 | 3/1977 | Jakel | 214/85 |
| 4,019,643 | 4/1977 | Kampman et al. | 414/481 |
| 4,044,906 | 8/1977 | Schrag et al. | 414/485 |
| 4,051,967 | 10/1977 | Sedgwick et al. | 214/505 |
| 4,168,932 | 9/1979 | Clark | 414/483 |
| 4,222,698 | 9/1980 | Boelter | 414/477 |
| 4,954,038 | 9/1990 | Sheahan | 414/482 |

Primary Examiner—Charles A. Marmor
Assistant Examiner—Anne Marie Boehler
Attorney, Agent, or Firm—Kinney & Lange

[57] ABSTRACT

A double bed snowmobile trailer includes an axle assembly, trailer support wheels rotatably mounted to the axle assembly to rotate about a common axle axis, a pair of trailer beds each mounted to the axle assembly to pivot independently of the other about the common axle axis, a draw bar pivotally connected with respect to the middle of the axle assembly and extending forwardly in normal relation to a vertical plane including the common axle axis, and means to releasably fasten each of the trailer beds to the draw bar to prevent rotation of the trailer bed with respect to the draw bar when the trailer beds are in a substantially horizontal over-the-road snowmobile transport position.

11 Claims, 3 Drawing Sheets

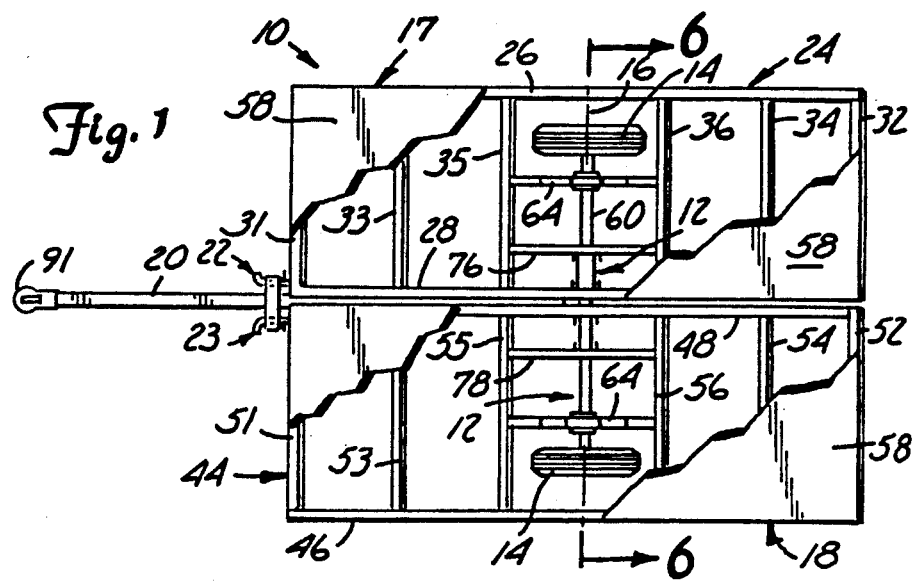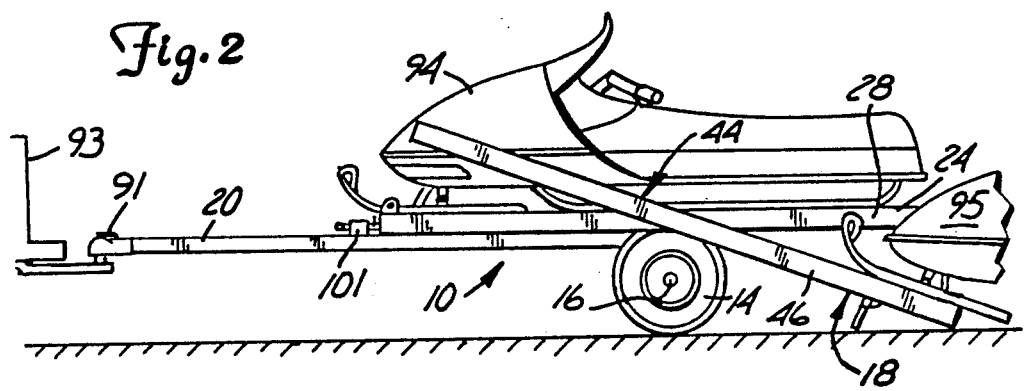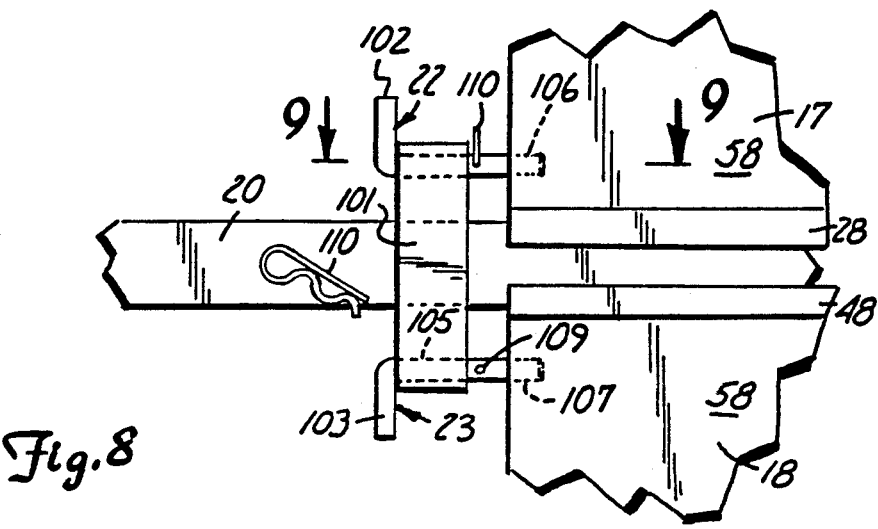

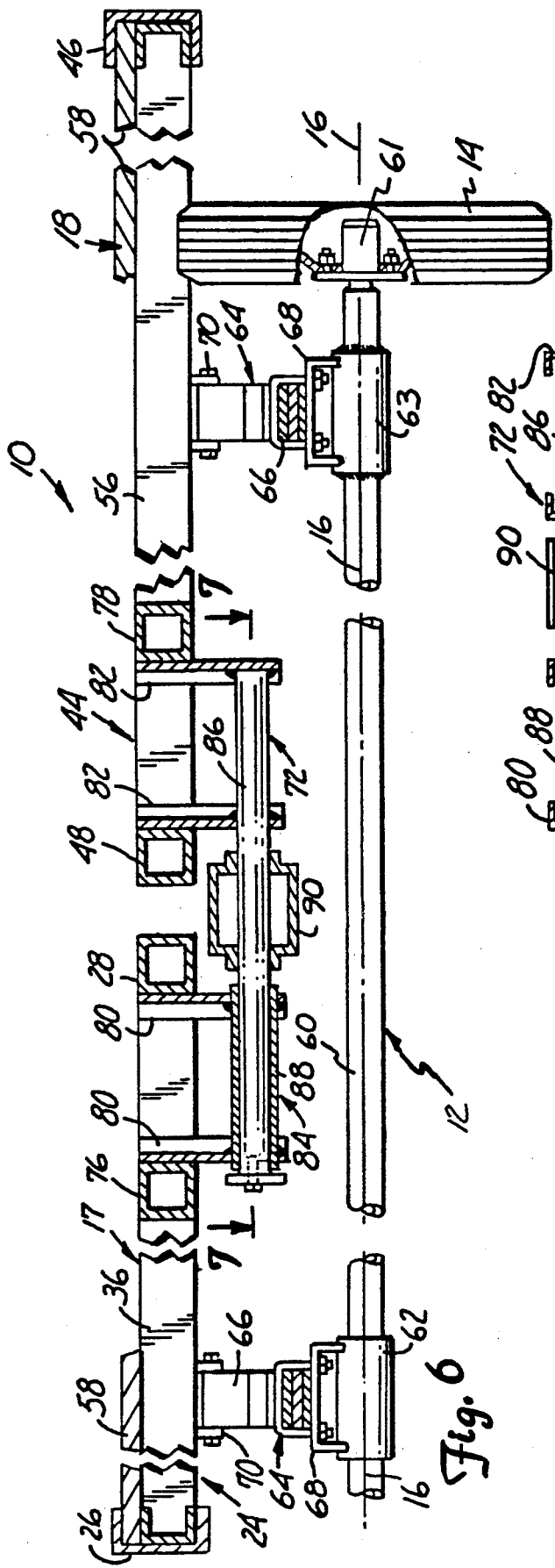
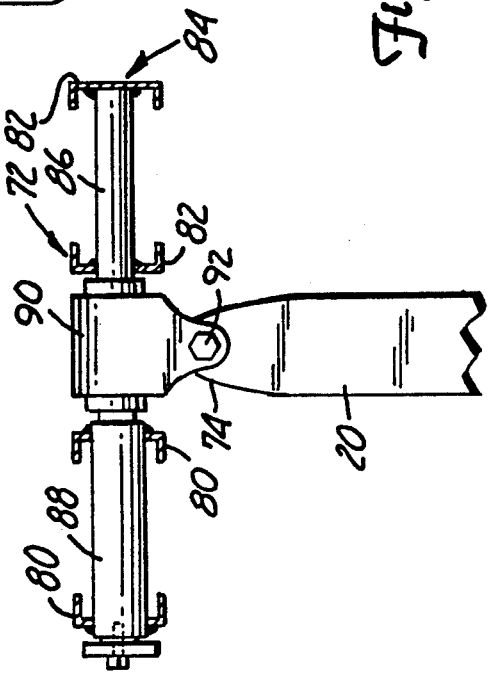
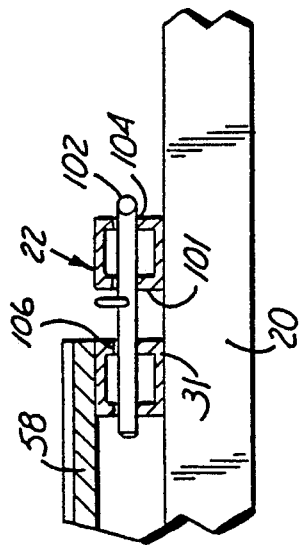

DOUBLE BED TRAILER

BACKGROUND OF THE INVENTION

1. Field of the Invention

This invention relates to trailers used for receiving, transporting over the road, and discharging lightweight vehicles such as snowmobiles, motorcycles, all terrain vehicles and the like.

2. Description of the Prior Art

The popularity of snowmobiles in the northern tiers of states and in the mountains during the late 1960's and in the 1970's resulted in the development of many varieties of trailers designed to carry these relatively narrow, motor powered, relatively lightweight vehicles from the owner's home bases to areas suitable for their use. The boom in the use of trailers to make possible such recreational activity in the cold climes of the United States, Canada and elsewhere in the world rivals the development and use of special use trailers to carry recreational boats to areas far from home and back again.

Many such snowmobile trailers were developed, some were patented, and many were quite suitable for the usages to which they were put. However, as in any boom of this nature, the relationship of weight, ease of operation, reliability, and usable life to cost was not a critical factor in the early years of the boom.

This activity now continues at a strong and steady rate; but efficiency, weight, reliability, trouble-free operation and useful lifetime in relationship to initial cost and cost of upkeep are now much more important factors.

A snowmobile necessarily uses skis or runners to support its front end and to steer it. It uses a relatively wide continuous track extending from the middle toward the rear to support the rear end and, most importantly, to drive the vehicle forward. Because skis and runners are effective in a forward direction only, it is generally not considered worthwhile to provide for powered drive in a reverse direction. Therefore, snowmobile trailers are often either provided with some way of discharging the snowmobiles in forward direction; or are provided with some means of depositing the rear end and track of the snowmobile on the ground and then pulling the trailer out from under it.

It is known to drive snowmobiles up on tilting trailer beds or platforms which are pivoted to trailer frames and to have those snowmobiles tip forward into horizontal positions as their centers of gravity pass the platform pivot points U.S. Pat. No. 3,786,950 granted to Zemien on Jan. 22, 1974; and U.S. Pat. No. 3,731,831 granted to Huff on May 8, 1973.

It is known to use parallel pairs of individually mounted trailer beds or platforms to receive, transport over the road, and discharge two snowmobiles or the like. See the following U.S. Pat. Nos. 4,168,932 granted to Clark on Sept. 25, 1979; 3,720,336 granted to Murray et al on Mar. 13, 1973; 3,945,521 granted to Decker on Mar. 23, 1976; and 3,604,579 granted to Jenkins on Sept. 14, 1971.

Various structures have been developed to allow snowmobiles to be driven forwardly to discharge them from snowmobile trailers. U.S. Pat. No. 4,014,444, granted to Jakel on Mar. 29, 1977 does not use a pivoted trailer bed, but rather uses a ramp which can be fastened behind a horizontal trailer bed so that a snowmobile can be driven up onto the bed from the rear, and utilizes the same ramp when fastened in front to deflect the skis or runners of the snowmobile to steer it and support it as it moves forwardly under its own power to leave the trailer.

Several of the patents listed above disclose elaborate, expensive and relatively unwieldy turntables between the trailer beds and fixed trailer frames. See U.S. Pat. Nos. 3,720,336; 3,945,521; and 3,604,579.

U.S. Pat. No. 3,731,831, also listed above, shows a trailer with a rigid frame to which is pivoted a drawbar or tongue. This drawbar can be swung under the trailer main frame at 90° either to the right or to the left in order to let a trailer bed pivot toward its front end so that a snowmobile can be driven forwardly off of the trailer.

U.S. Pat. No. 4,051,967, shows a structure whereby the rear end of a snowmobile is supported on an open U-shape subframe or trailer bed which is pivoted to an open U-shape trailer frame. To discharge the snowmobile, the bed is tipped back to allow the snowmobile to rest on the ground, the support between the rear of the snowmobile and the trailer bed is removed, and the trailer is then pulled ahead leaving the snowmobile discharged from it and ready for its intended use.

Also cited during a preliminary search on this invention were the following, which are not considered to be as pertinent as those discussed above: U.S. Pat. Nos. 3,730,542 granted to Chadwick on May 1, 1973; 3,720,335 granted to Ward on Mar. 13, 1973; 3,989,270 granted to Henderson on Nov. 2, 1976; and 4,222,698 granted to Boelter on Sept. 16, 1980.

Neither the inventor nor those in privity with him are aware of any prior art which is closer than that discussed above. Neither are they aware of any prior art which anticipates the claims set out herein.

SUMMARY OF THE INVENTION

A double bed trailer for receiving, transporting over the road and discharging a pair of relatively narrow vehicles, such as snowmobile, for example, includes an elongate, horizontally extending, axle assembly; trailer support wheels rotatably mounted with respect to the axle assembly to rotate about a common axle axis; and a pair of elongate trailer beds, each mounted to the axle assembly to pivot independently with the other about the common axle axis between at least a first position wherein its rear end portion is in close proximity to the ground and situated to receive a forwardly moving vehicle and a second generally horizontal over-the-road vehicle transport position.

An elongate trailer draw bar is mounted at its inner end with respect to a central portion of the axle assembly in position to extend forwardly in normal relation to a vertical plane including this common axle axis.

Means are provided to hitch an outer end of the draw bar to the rear of a tow vehicle.

Releasable means are provided to fasten each trailer bed to the draw bar to prevent the trailer bed from rotating with respect to the draw bar about the common axle axis when the trailer bed is in its second, generally horizontal, over-the-road vehicle transport position.

BRIEF DESCRIPTION OF THE DRAWINGS

FIG. is a top plan view of a double bed trailer made according to the present invention with parts of the trailer bed platforms broken away for clarity of illustration;

FIG. 2 is a side elevational view of the trailer of FIG. 1 showing it connected to a tow vehicle with a snowmobile in the background already in an over-the-road transport position, and showing a trailer bed in the foregoing in a first loading position with its rear end portion in close proximity to the ground, and showing a snowmobile in the process of driving onto that trailer bed under its own power;

FIG. 6 is an enlarged vertical sectional view taken on the line 6—6 in FIG. 1 with parts omitted and parts broken away for clarity of illustration;

FIG. 7 is a fragmentary horizontal sectional view taken on the line 7—7 in FIG. 6;

FIG. 8 is an enlarged fragmentary top plan view of the portion of the trailer of FIG. 1 at the forward and inward corners of the double trailer beds and showing an intermediate portion of the draw bar; and FIG. 9 is a fragmentary vertical sectional view taken on the line 9—9 in FIG. 8.

DETAILED DESCRIPTION OF THE PREFERRED EMBODIMENTS

Figure 3:
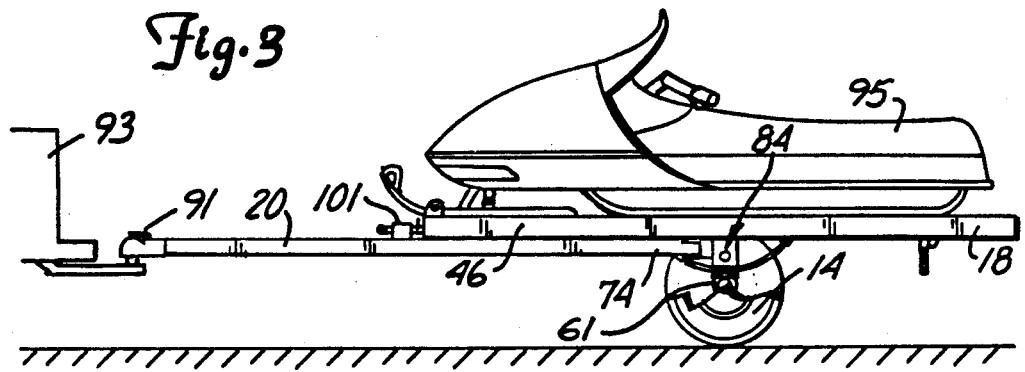
FIG. 3 is a side elevational view with parts in section and parts broken away of the trailer of FIGS. 1 and 2 connected to a tow vehicle with snowmobiles on the trailer bed platforms both of which are in second transport positions.

A double bed trailer 10 of the present invention includes an elongate, horizontally extending, axle assembly 12, a pair of trailer support wheels 14,14 rotatably mounted at opposite ends of the axle assembly 12 to rotate on a common axle axis 16; a starboard trailer bed 17 and a port trailer bed 18, each independently pivotally mounted with respect to the axle assembly 12 to pivot about the common axle axis 16; a trailer draw bar or tongue 20 pivotally mounted with respect to a central portion of the axle assembly on a generally vertical axis; and independent means 22 and 23 to releasably fasten trailer beds 17 and 18, respectively, to the draw bar 20 to prevent rotation of either trailer bed about the common axle axis when the trailer is hitched to a tow vehicle and the trailer beds are in a transport position.

Figure 5:
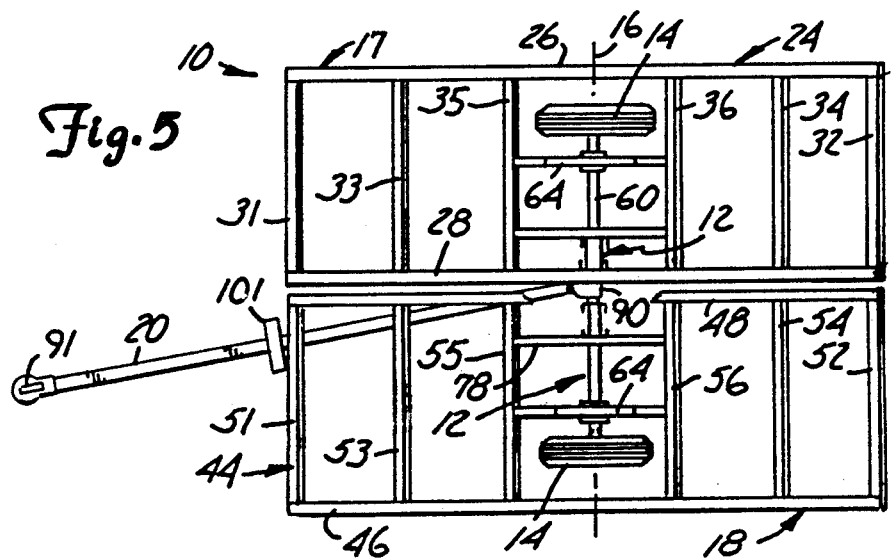
FIG. 5 is a top plan view of the trailer of FIG. 4 showing the positioning of the draw bar in clearing relation to the background trailer bed to allow it to take the position seen in FIG. 4.

As best seen in FIGS. 1 and 5, the starboard trailer bed 17 includes a rectangular metal framework 24 including a longitudinally extending outer side bar 26 and a spaced-apart parallel inner side bar 28. These side bars are each integrally connected in fixed relation to each other by a series of cross bars including a leading cross bar 31, a trailing cross bar 32, intermediate cross bars 33 and 34 and central support cross bars 35 and 36.

Port trailer bed 18 includes a rectangular metal framework 44 having a longitudinally extending outer side bar 46 and a longitudinally extending inner side bar 48, parallel to the outer side bar. The side bars are integrally connected in fixed relation to each other by a number of cross bars including a leading cross bar 51, a trailing cross bar 52, intermediate cross bars 53 and 54, and central support cross bars 55 and 56.

The axle assembly 12 includes an axle 60, wheel bearings 61 at each end of the axle (one is shown), a starboard trailer bed pivot sleeve 62 and a port trailer bed pivot sleeve 63, each supported on the axle 60 in such a manner as to allow rotation about the common axle axis 16.

Extending integrally upwardly from each of the pivot sleeves 62 and 63 are trailer bed support stanchions 64,64 which connect each pair of central support cross bars to its pivot sleeve.

In the form of the invention as shown, these trailer bed support stanchions 64 take the form of leaf spring assemblies 66,66 each fixedly mounted to a pivot sleeve by a bracket 68. As perhaps best seen in FIGS. 1, 5 and 6, opposite ends of each of the leaf spring assemblies 66 are attached to the underside of one of the central support cross bars 35, 36, 55 or 56 as at 70.

In order that the trailer beds 17 and 18 can move independently of each other with respect to the axle assembly 12, one of the pivot sleeves 62 and 63 is welded to the axle 60 and the other is free to rotate with respect to that axle.

To stabilize the trailer beds 17 and 18, a stabilizing assembly 72 is provided at position directly over the axle assembly 12 and supports inner edge portions of the trailer beds 17 and 18 for pivotal movement with respect to each other. The stabilizer assembly also provides an anchor point for an inner end 74 of the trailer draw bar 20 at a position in closely adjacent relation to a vertical plane including the common axle axis 16.

As perhaps best seen in FIG. 6, stabilizer assembly 72 includes a short, longitudinally extending, starboard trailer frame stabilizer assembly support beam 76; and a similar short, longitudinally extending, port trailer bed frame stabilizer support beam 78. Beam 76 extends integrally between its central support cross bars 35 and 36, and beam 78 extends between cross bars 55 and 56.

Extending integrally downwardly from support beam 76 and inner side bar 28 of the starboard trailer bed framework 24 are a pair of starboard hangers 80,80. Extending integrally downwardly from support beam 78 and inner side bar 48 of the port trailer bed framework 44 are a pair of port hangers 82,82. A stabilizing bar assembly 84 is supported on each of the hangers 80,80, 82 and 82 in such a manner that the trailer beds can pivot freely with respect to each other. To accomplish this, the stabilizing bar assembly 84 includes a solid cylindrical stabilizing bar 86 rigidly mounted with respect to hangers 82,82 (by welding as shown). The stabilizing bar assembly 84 also includes a cylindrical stabilizing sleeve 88 which encompasses bar 86 and is supported for mutual rotation with respect to it, the sleeve 88 being permanently affixed to the hangers 80,80 (as by welding as shown).

A draw bar anchor bearing 90 is rotatably mounted on the solid cylindrical stabilizing bar 86 between adjacent hangers 80 and 82 and pivotally supports inner end 74 of the draw bar 20 to pivot on a vertical axis as at 92.

In the drawings, trailer draw bar 20 is seen to have a trailer hitch 91 of any usual or preferred construction for hitching it to a tow vehicle 93. Associated with the starboard trailer bed 17 is a background or starboard snowmobile 94; and associated with port trailer bed 18 is a foreground or port snowmobile 95.

As shown, the independent means 22 and 23 to fasten starboard trailer bed 17 and port trailer bed 18, respectively, against pivotal movement with respect to trailer draw bar 20 include a trailer bed anchor block 101 extending integrally and transversely outwardly from the draw bar 20, and L-shape trailer bed arresting pins 102 and 103. The anchor block 101 is provided with an opening 104 therethrough to receive pin 102 and with an opening 105 to receive pin 103. Leading cross bar 31 of the rectangular metal framework 24 of the starboard trailer bed 17 is provided with an opening 106 to receive arresting pin 102; while leading cross bar 51 is provided with an opening 107 to receive pin 103.

FIGS. 8 and 9 disclose the trailer beds 17 and 18 in their horizontal second position with the L-shape trailer bed arresting pins 102 and 10 in place to prevent rotation of the trailer beds with respect to the draw bar 20. Each of the pins 102 and 103 have small openings 109 therethrough, and once installed, cotter clips 110 will be placed through these openings 109 to retain the trailer beds in such fixed relationship to the draw bar until it is again time to load or unload snowmobiles. The cotter clip 110 for preventing removal of arresting pin 102 is shown in place in FIG. 8, while the cotter clip 110 for fixedly positioning the arresting pin 103 is shown resting on the draw bar 20 just prior to being installed. This gives a plan view of one suitable cotter clip. Any kind of suitable cotter arrangement can be used to retain the pins 102 and 103, however.

OPERATION

With both the trailer beds 17 and 18 empty, and fastened in their over-the-road position or second position by independent fastening means 22 and 23, all as seen in FIG. 1, it will usually be most convenient to hitch the draw bar 20 and its trailer hitch 91 to a tow vehicle 93 as seen in FIG. 2, for example. Then one or the other, or both, of the independent fastening means 22 and 23 can be unfastened and an unfastened trailer bed will be tipped down to the rear to its first, receiving or loading position. In FIG. 2, the port trailer 18 in the foreground is shown tipped into this first position. In this position, the port snowmobile 95, in the foreground of FIG. 2, can be driven under its own power up onto the trailer bed 18. When the center of gravity of the trailer and its driver cross over a vertical plane including the common axle axis 16, the trailer bed 18 will tend to tip down toward a horizontal position. When this position is reached, independent means 23 will be used to removably fasten the trailer bed 18 in fixed relationship to the draw bar 20. In FIG. 2, starboard snowmobile 94 in the background of that figure is illustrated at having already been loaded and fastened.

When both snowmobiles have been installed, they will have position as seen in FIG. 3. The trailer and the snowmobiles will then be towed to a position for use or to a position for storage between uses using the tow vehicle 93.

In order to discharge the snowmobiles from the double bed trailer 10, it is probably usually easier to unhitch the draw bar 20 and to tip the trailer and its load forward so that the trailer hitch 91 is resting on the ground. By backing and turning the tow vehicle, however, positioning of the tow bar and the trailer with respect to each other and positioning of the trailer with respect to the rear of the tow vehicle can be such that the snowmobiles can be off-loaded from their trailer beds, one at a time. This may be somewhat more difficult and somewhat more time consuming than the unloading or discharging operation now to be described.

Figure 4:
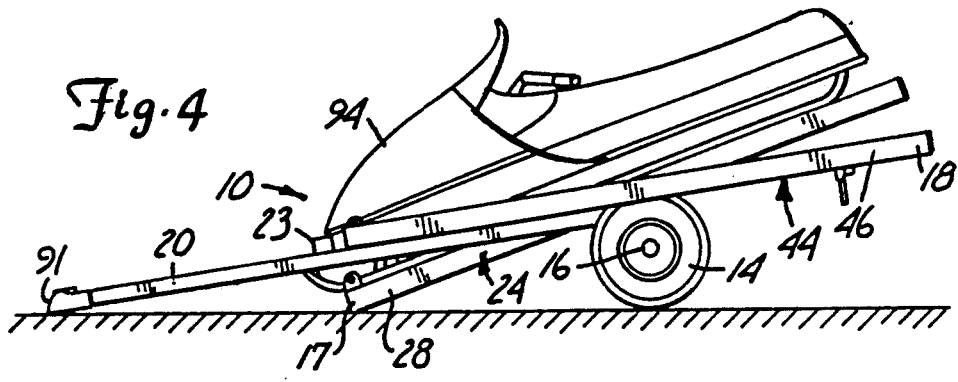
FIG. 4 is a side elevational view of the trailer of the invention with the drawbar of the trailer removed from the tow vehicle and resting on the ground, with the trailer bed in the foreground shown in transport position but without a snowmobile on it, and showing the trailer bed in the background in a third discharge position with its front end portion in contact with the ground and with a snowmobile on it ready to be driven forwardly off of the trailer under its own power.

With the trailer positioned as seen in FIG. 4, both of the trailer beds can be unfastened from the draw bar 20, and the draw bar moved horizontally away from the starboard trailer bed, for example, to a position under port trailer bed 18 as seen in FIG. 5. Once the draw bar is clear out from under the forwardmost portion of the starboard trailer bed 17, for example, that trailer bed can be lowered to where its forward end is in close proximity to the ground, as seen in FIG. 4, and the background or starboard snowmobile 94 can be driven forwardly off of the trailer bed 18 under its own power.

After that is accomplished, the starboard trailer bed 17 can be raised and the draw bar slid over under the trailer bed 18. The port trailer bed 18 will then rest on the ground so that any snowmobile which was on it can be off-loaded by driving it forwardly.

For clarity of illustration, snowmobile 95 is omitted from the disclosure of FIG. 4, and that figure illustrates the situation which would exist if the foreground or port snowmobile 95 had been discharged from the trailer first.

Although the present invention has been described with reference to preferred embodiments, workers skilled in the art will recognize that changes may be made in form and detail without departing from the spirit and scope of the invention.

What is claimed is:
1. A double bed trailer for receiving, transporting over the road and discharging a pair of relatively narrow vehicles, said trailer including:
 (a) an elongate, horizontally extending, axle assembly;
 (b) trailer support wheels rotatably mounted with respect to the axle assembly to rotate about a common axle axis;
 (c) a pair of elongate trailer beds, each mounted to said axle assembly to pivot independently of the other about the common axle axis between a first position wherein its rear end portion is in close proximity to the ground and situated to receive a forwardly moving vehicle and a second generally horizontal over-the-road vehicle transport position;
 (d) an elongate trailer draw bar mounted at its inner end with respect to a central portion of the axle assembly in position to extend forwardly in normal relation to a vertical plane including the common axle axis;
 (e) means to hitch an outer end of the draw bar to the rear of a tow vehicle;
 (f) means to releasably fasten each trailer bed to the draw bar to prevent trailer bed rotation with respect to the draw bar about the common axle axis when that trailer bed is in its second position;
 (g) wherein each of the trailer beds is mounted to the axle assembly to pivot independently of the other from said second generally horizontal over-the-road vehicle transport position to a third position wherein its front end portion is in close proximity to the ground and the trailer bed is situated to discharge a forwardly moving vehicle.
2. The trailer of claim 1 wherein:
 (h) the trailer draw bar is mounted at its inner end to pivot with respect to the axle assembly on a generally vertical axis lying in a vertical plane including the common vertical axis to be capable of limited movement in the generally horizontal plane and out of normal relation to said vertical plane including the common vertical axis.

3. A double bed trailer for receiving, transporting over the road and discharging a pair of snowmobiles, said trailer including:
   (a) an elongate, horizontally extending, axle assembly;
   (b) trailer support wheels rotatably mounted with respect to the axle assembly to rotate about a common axle axis;
   (c) a pair of elongate trailer beds, each mounted to said axle assembly to pivot independently of the other about the common axle axis between a first position wherein its rear end portion is in close proximity to the ground and situated to receive a forwardly moving snowmobile and a second generally horizontal over-the-road snowmobile transport position;
   (d) an elongate trailer draw bar mounted at its inner end with respect to a central portion of the axle assembly in position to extend forwardly in normal relation to a vertical plane including the common axle axis;
   (e) means to hitch an outer end of the draw bar to the rear of a tow vehicle;
   (f) means to releasably fasten each trailer bed to the draw bar to prevent trailer bed rotation with respect to the draw bar about the common axle axis when that trailer bed is in its second position;
   (g) wherein each of the trailer beds is mounted to the axle assembly to pivot independently of the other from said second generally horizontal over-the-road snowmobile transport position to a third position wherein its front end portion is in close proximity to the ground and the trailer bed is situated to discharge a forwardly moving snowmobile.

4. The trailer of claim 3 wherein:
   (h) the trailer draw bar is mounted at its inner end to pivot with respect to the axle assembly on a generally vertical axis lying in a vertical plane including the common vertical axis to be capable of limited movement in the generally horizontal plane and out of normal relation to said vertical plane including the common vertical axis.

5. The trailer of claim 3 wherein:
   (g) the axle assembly includes an axle, wheel bearings at each end of the axle on which the trailer support wheels are mounted to rotate on said common axle axis, a pair of trailer bed pivot sleeves in concentric, supported, relation to the axle, a trailer bed support stanchion extending upwardly from each of the pivot sleeves, and bracket means connecting each of the stanchions to one of the trailer beds to substantially fixedly support the trailer bed for rotational movement only about the common axle axis.

6. The trailer of claim 5 wherein:
   (h) one of the trailer bed pivot sleeves is freely rotatable on the axle about the common axle axis and the other trailer bed pivot sleeve is fixed against rotational movement with respect to the axle while that sleeve and the axle rotate about the common axle axis.

7. The trailer of claim 5 wherein:
   (h) each trailer bed includes a rigid rectangular frame having an inner side bar and an outer side bar, a leading cross bar and a trailing cross bar joining the inner and outer side bars and two parallel, spaced-apart, central support cross bars extending in parallel spaced relation above the common axle axis, one forwardly of the axis and one rearwardly thereof; and
   (i) each of the trailer support stanchions includes an upwardly extending leaf spring assembly rigidly mounted at its lower center portion to one of the trailer bed pivot sleeves, and rigidly mounted at each of its upper end portions to one of the spaced-apart central support cross bars.

8. The trailer of claim 7 and:
   (j) a stabilizer assembly including:
   (1) a pair of stabilizer support beams each extending in normal relation to a vertical plane including the common axle axis, and each rigidly supported with respect to one of the rectangular trailer bed frameworks in spaced, parallel, relation to the inner side bar of that framework,
   (2) wherein a pair of parallel, spaced-apart, vertical hangers extend down from each of the trailer bed frameworks, one from the stabilizer support beam and one from the inner side bar on each of the trailer beds,
   (3) an elongate, horizontal, stabilizing bar extending through bottom end portions of all four of the hangers, integrally connected to the hangers extending down from a first of the trailer beds,
   (4) a cylindrical stabilizing sleeve concentric with the stabilizing bar, supportingly encompassing it, said sleeve being integrally connected to the vertical hangers extending down from a second of the trailer beds, and
   (5) wherein the axes of the stabilizing bar and stabilizing sleeve nominally lie in a vertical plane including the common axle axis when both trailer beds are in their second positions.

9. The trailer of claim 8 wherein:
   (k) a draw bar anchor bearing is supported on the cylindrical stabilizing bar between the hangers fastened to the stabilizing bar and the hangers fastened to the stabilizing sleeve; and
   (n) the inner end of the trailer draw bar is pivotally mounted on a substantially vertical axis to the draw bar anchor bearing.

10. The trailer of claim 7 wherein:
   (j) the means to releasably fasten each trailer bed to the draw bar includes a trailer bed anchor block extending integrally and transversely from the trailer draw bar at position adjacent to but forwardly of and in alignment with corner portions of each of the rectangular trailer bed frames, the trailer bed anchor block being provided with an arresting pin receiving opening in alignment with each of the trailer bed frames, these frames each being provided with similar openings, each such frame opening being concentric with one of the trailer bed anchor block openings when its trailer bed is in its second position; and
   (k) the releasable fastening means including a pair of trailer bed arresting pins of size and configuration to fit through both one opening in the trailer bed anchor block and an opening in one of the trailer bed frame works when that trailer bed is in its second, generally horizontal position.

11. A double bed trailer for receiving, transporting over the road and discharging a pair of snowmobiles, said trailer including:

(a) an elongate, horizontally extending, axle assembly;
(b) trailer support wheels rotatably mounted with respect to the axle assembly to rotate about a common axle axis;
(c) a pair of elongate trailer beds, each mounted to said axle assembly to pivot independently about the common axle axis from a first position wherein its rear end portion is in close proximity to the ground and situated to receive a forwardly moving snowmobile, through a second generally horizontal over-the-road snowmobile transport position, and to a third position wherein its front end portion is in close proximity to the ground and situated to discharge a forwardly moving snowmobile;
(d) an elongate trailer draw bar pivotally mounted at an inner end thereof with respect to a central portion of the axle assembly only on a generally vertical axis, in position to nominally extend away from a vertical plane including the common axle axis in but a simple normal relation to that plane, said draw bar being capable of limited movement in a generally horizontal plane out of normal relation to said vertical plane;
(e) wherein said movement of the draw bar out of normal relation to said vertical plane is sufficient to permit it to move selectively and alternatively out of vertical alignment with each of the trailer beds to permit each such bed to move to its third position;
(f) means to hitch an outer end of the draw bar to the rear of a towing vehicle; and
(g) means to releasably fasten each trailer bed to the draw bar to prevent trailer bed rotation about the common axle axis when the draw bar extends in normal relation to the common axle axis and that trailer bed is in its second position.

* * * * *